US012520071B2

(12) United States Patent
Bolsman

(10) Patent No.: US 12,520,071 B2
(45) Date of Patent: Jan. 6, 2026

(54) SOUND CHANNEL, PORTABLE AUDIO DEVICE COMPRISING SUCH A SOUND CHANNEL AND METHOD OF OPERATING SUCH A SOUND CHANNEL

(71) Applicant: Sonion Nederland B.V., Hoofddorp (NL)

(72) Inventor: Caspar Titus Bolsman, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 219 days.

(21) Appl. No.: 18/260,884

(22) PCT Filed: Feb. 11, 2022

(86) PCT No.: PCT/EP2022/053339
§ 371 (c)(1),
(2) Date: Jul. 10, 2023

(87) PCT Pub. No.: WO2022/175172
PCT Pub. Date: Aug. 25, 2022

(65) Prior Publication Data

US 2024/0064452 A1 Feb. 22, 2024

(30) Foreign Application Priority Data

Feb. 16, 2021 (NL) ..................................... 2027562

(51) Int. Cl.
*H04R 25/00* (2006.01)
*H04R 1/10* (2006.01)

(52) U.S. Cl.
CPC ......... *H04R 1/1041* (2013.01); *H04R 1/1058* (2013.01); *H04R 2460/11* (2013.01)

(58) Field of Classification Search
CPC ........................... H04R 1/1041; H04R 1/1058
See application file for complete search history.

(56) References Cited

U.S. PATENT DOCUMENTS 9,344,791 B2 * 5/2016 Zhao .................... H04R 1/1016
2012/0217087 A1 * 8/2012 Ambrose ............ H04R 1/1016 181/130

(Continued)

FOREIGN PATENT DOCUMENTS

EP 3471432 A1 4/2019
JP 2007224767 A 9/2007

OTHER PUBLICATIONS

International Search Report for International application No. PCT/EP2022/053339 dated May 17, 2022.

(Continued)

*Primary Examiner* — Fan S Tsang
*Assistant Examiner* — Simon King
(74) *Attorney, Agent, or Firm* — Harness, Dickey & Pierce, P.L.C.

(57) ABSTRACT

The invention relates to a sound channel and a portable audio device comprising such a sound channel, wherein said sound channel comprises a vent path, a closing element and a guiding surface for guiding a movement of the closing element, wherein said closing element is slidably moveable with respect to said guiding surface by a driving means between a first position in which the closing element substantially closes the vent path and a second position in which the closing element leaves the vent path open, and wherein the closing element comprises a stop surface that engages a stop element of the sound channel in the first position of the closing element and a sliding surface that extends substantially parallel to said guiding surface, wherein a liquid is present between the sliding surface of said closing element and the guiding surface. The invention also relates to a method of operating such a sound channel.

20 Claims, 3 Drawing Sheets

(56) References Cited

U.S. PATENT DOCUMENTS

Figure 1A:
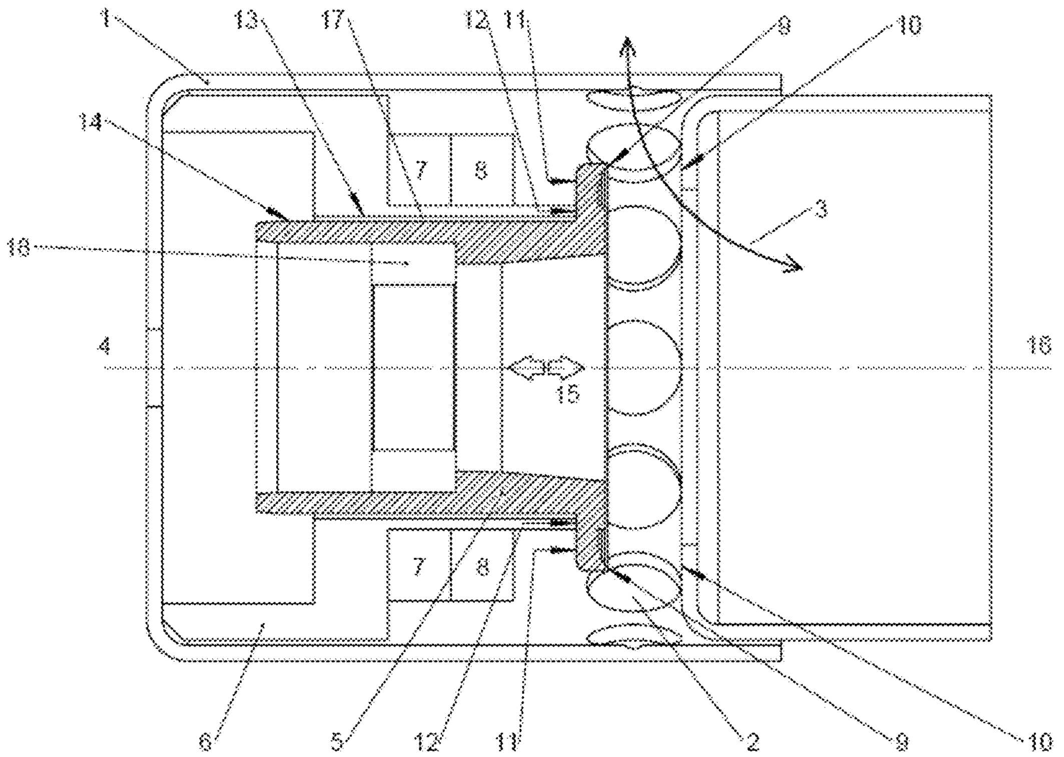

| | | | | |
|---|---|---|---|---|
| 2015/0382117 | A1* | 12/2015 | Vermeiren | H04R 25/65<br>600/25 |
| 2019/0116436 | A1* | 4/2019 | Lawand | H04R 1/1016 |
| 2020/0260197 | A1* | 8/2020 | Thomsen | H04R 25/48 |
| 2020/0288251 | A1* | 9/2020 | Kuipers | H04R 1/1041 |

OTHER PUBLICATIONS

Written Opinion for International application No. PCT/EP2022/053339 dated May 17, 2022.

* cited by examiner

SOUND CHANNEL, PORTABLE AUDIO DEVICE COMPRISING SUCH A SOUND CHANNEL AND METHOD OF OPERATING SUCH A SOUND CHANNEL

CROSS-REFERENCE TO RELATED APPLICATIONS

This application is a national phase under 35 U.S.C. § 371 of PCT International Application No. PCT/EP2022/053339 which has an International filing date of Feb. 11, 2022, which claims priority to Netherlands Application No. 2027562, filed Feb. 16, 2021, the entire contents of each of which are hereby incorporated by reference.

The invention relates to a sound channel for a portable audio device, for example a headphone or an in-ear device, such as a hearing aid, hearing device, hearable, earphone, earbud and the like, wherein said sound channel comprises a vent path, a closing element and a guiding surface for guiding a movement of the closing element, wherein said closing element is slidably moveable with respect to said guiding surface by a driving means between a first position in which the closing element substantially closes the vent path and a second position in which the closing element leaves the vent path open, and wherein the closing element comprises a stop surface that engages a stop element of the sound channel in the first position of the closing element and a sliding surface that extends substantially parallel to said guiding surface.

Such a sound channel is for example known from the European patent application with number EP3471432 (A1) in the name of the same applicant. An unwanted sound, like a click sound may occur when the closing element engages the stop element. It is now an object of the invention to avoid or at least reduce this click sound.

Other interesting technology may be seen in US2020/288251, US2019/116436, US2012/217087, US2020/260197, US2015/382117 and JP2007 224767.

This object of the invention is met by providing a sound channel as described in the preamble, wherein a liquid is present between the sliding surface of said closing element and the guiding surface.

Said sliding surface of said closing element slides along the guiding surface when moving between its two positions and by providing the liquid between this sliding surface and the guiding surface the maximum velocity of the movement of the closing element is reduced with respect to when no such liquid is provided and thereby the sound when the stop surface engages the stop element is reduced.

Said liquid may thus in particular be referred to as a damping liquid or velocity reducing liquid.

Said liquid may be a gel.

By providing the liquid especially in a space or clearance between the sliding surface of said closing element and the guiding surface, which space has a relatively small width, i.e. a small distance between said two surfaces, and a relatively large surface area defined by said surfaces, said liquid provides relatively high resistance against the sliding movement of the closing element with respect to the guiding surface and thereby efficiently reduces said maximum velocity.

It is in particular advantageous if a liquid is provided that has relatively high viscosity, such that a relatively high resistance against the sliding movement of the closing element with respect to the guiding surface is provided. For example said liquid may be a viscous liquid preferably having a viscosity of between 100-400 cps or mPa·s. The applicant has found that such a viscosity is in particular suitable for this purpose, because it is sufficiently high to effectively reduce the maximum velocity of the closing element but does allow for the movement of the closing element.

For example said liquid may be an oil. Oily liquids may have a sufficiently high viscosity, for example as defined above.

Practically said liquid is biocompatible. This is in particular suitable if said sound channel is used for in-ear devices.

Other suitable characteristics of said liquid may be that the liquid does not easily evaporate, such that it may remain present in said area for a relatively long time.

Alternatively or additionally, said liquid has a relatively high surface tension. This may prevent said liquid from leaving said area between the sliding surface and guiding surface as a result of the capillary effect.

In an embodiment of the sound channel according to the invention, a clearance having a width and length is defined between the sliding surface of the closing element and the guiding surface, and wherein the width is smaller than the length, preferably 10 times smaller, more preferably 20 times smaller.

As described above, if said liquid is provided in such a clearance having a relatively small width, said liquid provides relatively high resistance against the sliding movement of the closing element with respect to the guiding surface and thereby efficiently reduces said maximum velocity.

Said width is in particular defined in a direction substantially orthogonal to the sliding surface and the guiding surface.

In another embodiment of the sound channel according to the invention said sliding surface and said guiding surface have a substantially cylindrical shape, and wherein the sliding surface and guiding surface are coaxially arranged with respect to each other.

Said cylindrical guiding surface may substantially enclose the circumference of the sliding surface or vice versa.

As seen in an axial direction, i.e. in the direction of the common axis of said cylindrical guiding surface and sliding surface, said cylindrical sliding surface of the closing element may be arranged substantially within or around the cylindrical guiding surface in the second position thereof and extend partly outside or beyond said guiding surface in the first position thereof.

In another embodiment of the sound channel according to the invention said closing element is moveable in a reciprocating manner in a moving direction, wherein the moving direction is substantially parallel to the common axis of the coaxially arranged sliding surface and guiding surface.

Said guiding surface may be any suitable surface of the sound channel. For example said sound channel may comprise a guiding element that comprises said guiding surface. Said guiding element may be arranged for guiding the movement of the closing element and/or for holding the closing element. Said guiding element may thus alternatively or additionally be referred to as a holding element.

In an embodiment of the sound channel according to the invention said closing element comprises a second stop surface that engages a second stop element of the sound channel in the second position of the closing element.

In such an embodiment both end positions of the closing element are defined by the respective stop elements. In the first position the position of the closing element is defined by the stop element and in the second position the position of the closing element is defined by the second stop element.

It is noted that the stop surface and stop element as described above may also be referred to as the first stop surface and first stop element, respectively.

Said liquid may also reduce the maximum velocity of the closing element when it moves from its first position to its second position and thereby also the sound made when the second stop surface engages the second stop element.

Said second stop element may for example be part of said guiding element.

In a preferred embodiment, the sliding surface defines a channel in which the guiding surface extends. Both surfaces may have circular cross sections and be tube-shaped. In one embodiment, the closing element defines outwardly flairing portions of the channel. Outwardly flairing portions may be portions of the closing element having or defining an increasing cross sectional area and/or distance to the guiding surface in a distance away from a centre of the channel formed by the sliding surface.

As an alternative or addition to this outward flairing, the guiding surface may be inwardly flairing or narrowing to arrive at the same overall effect that the liquid is not scraped away from the surfaces and is allowed to enter the space between the surfaces by the capillary effect.

The invention also relates to a portable audio device, for example a headphone or an in-ear device, such as a hearing aid, hearing device, hearable, earphone, earbud and the like, said in-ear device comprising a transducer for generating acoustic energy and a sound channel connecting to said transducer via a sound opening, wherein said sound channel is the sound channel as described above with respect to any one or more of the described embodiments and/or having any one or more of the above described features, alone or in any suitable combination.

The invention further relates to a method of operating a sound channel as described above with respect to any one or more of the described embodiments and/or having any one or more of the above described features, alone or in any suitable combination, or a portable audio device as described above, comprising the steps of:

a) providing a sound channel as described above with respect to any one or more of the described embodiments and/or having any one or more of the above described features, alone or in any suitable combination, or a portable audio device as described above;
b) moving said closing element between said first position in which the closing element substantially closes the vent path and said second position in which the closing element leaves the vent path open using said driving means, wherein the liquid that is present between the sliding surface of the closing element and the guiding surface limits a maximum velocity of the movement of the closing element.

As described above with respect to the sound channel according to the invention, the maximum velocity of the movement of the closing element is reduced with respect to such a sound channel where no liquid is present between the sliding surface of the closing element and the guiding surface, i.e. the liquid limits the maximum velocity.

Other advantages and/or features of the method will be apparent from the description of the sound channel according to the invention as described above.

For example, said method may comprise a step of arranging and/or replacing said liquid between the sliding surface of the closing element and the guiding surface. For example, said liquid may get contaminated and may in such a case be replaced by a new liquid.

Figure 1B:
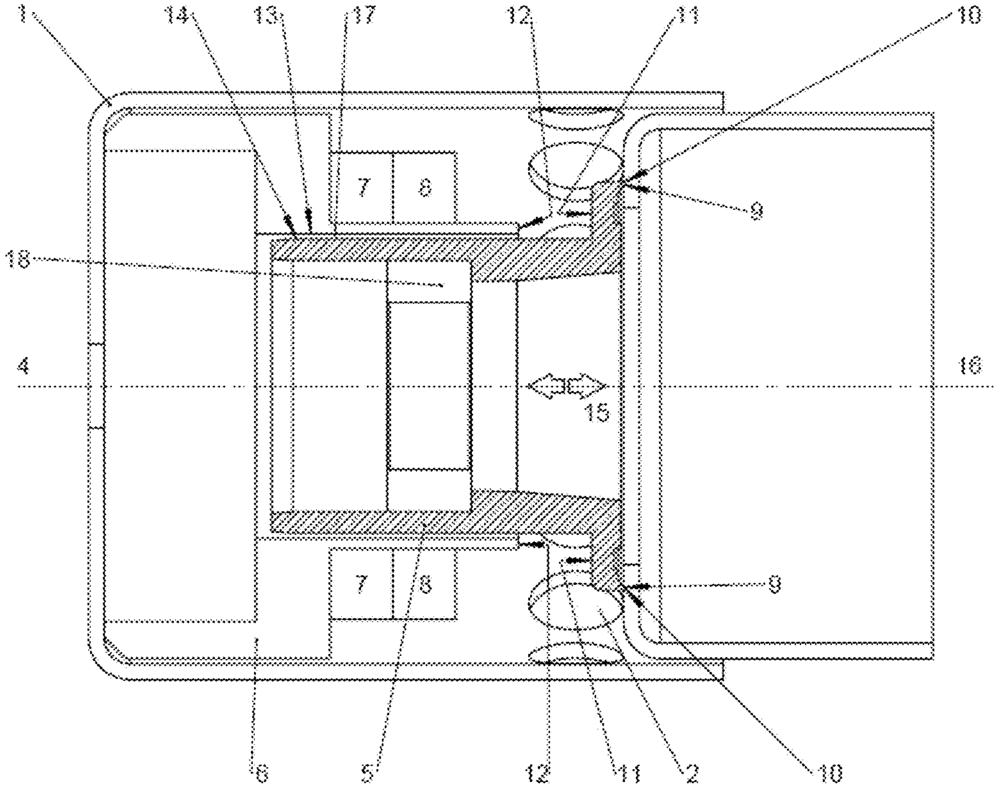
Figure 2A:
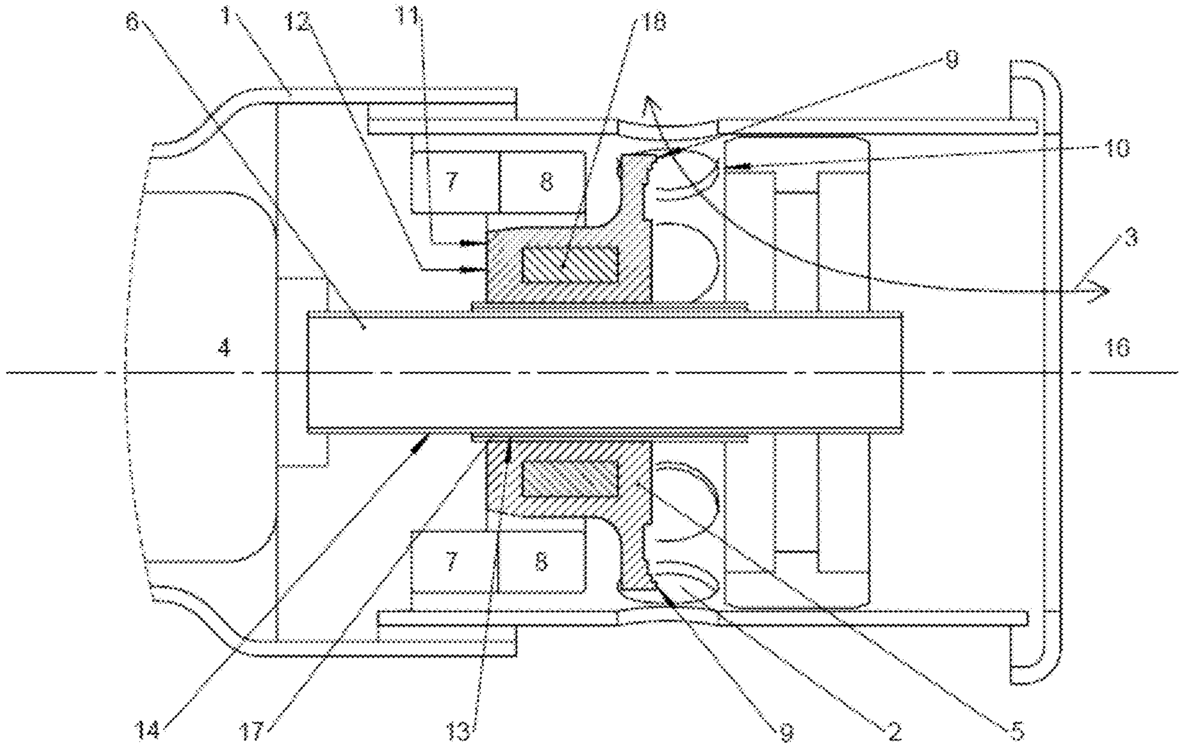
Figure 2B:
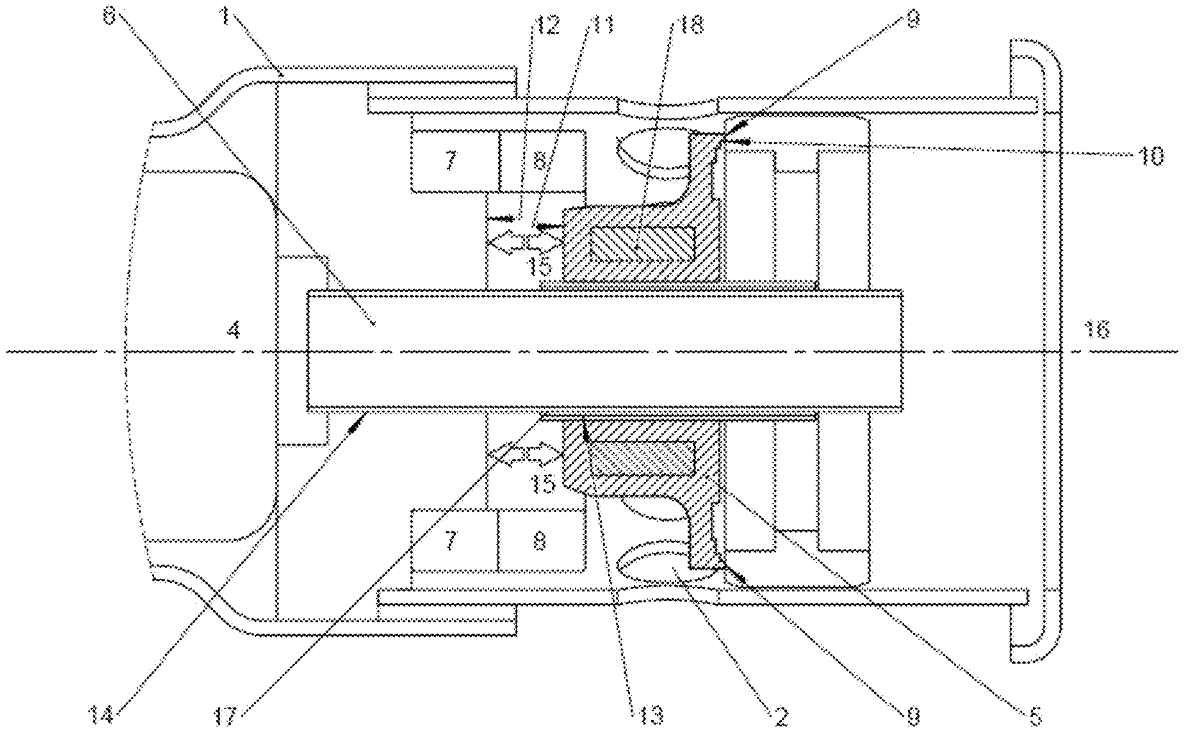
Figure 3:
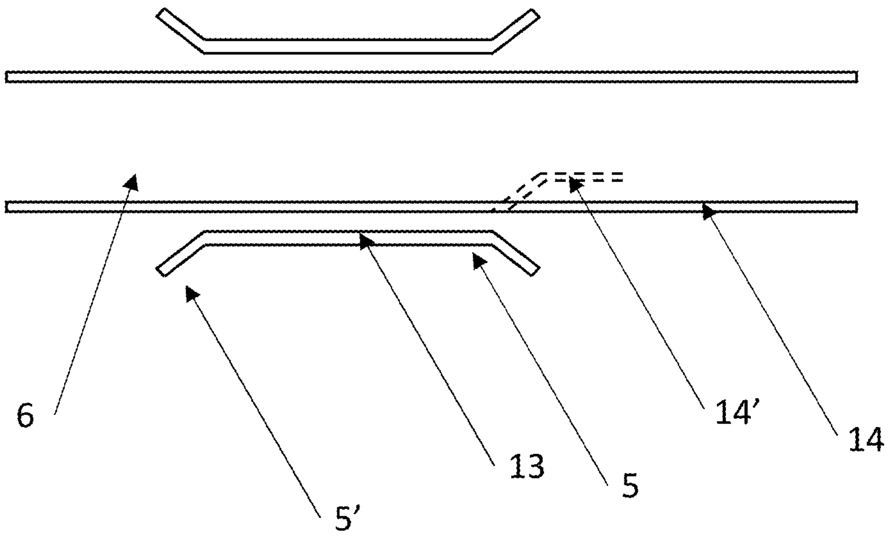

The invention will be further elucidated with reference to figures, wherein:

FIGS. 1*a* and 1*b* show a schematic cross section of the sound channel according to an exemplary embodiment, wherein FIG. 1*a* shows the closing element in a second position and FIG. 1*b* shows the closing element in a first position, FIGS. 2*a* and 2*b* show a schematic cross section of the sound channel according to a second exemplary embodiment, wherein FIG. 2*a* shows the closing element in a second position and FIG. 2*b* shows the closing element in a first position, and FIG. 3 illustrates an embodiment in which the closing element has a tapering shape.

In the figures same features are referred to by same reference numerals.

FIGS. 1*a* and 1*b* show a sound channel 1 according to a first embodiment of this invention. In this exemplary embodiment the sound channel 1 has a substantial cylindrical shape, wherein a plurality of openings 2 are provided in the circumferential wall of the sound channel 1 through which air may enter and leave the sound channel 1 and which are part of a vent path 3. A sound opening 4 is provided at a first axial end of the sound channel 1 which may connect to a transducer. A valve or closing element 5 is provided within the sound channel 1 and is guided and/or held by a guiding element 6, wherein said closing element 5 is slidably moveable with respect to said guiding element 6 by a driving means 7, 8, 18 between a first position in which the closing element 5 substantially closes the vent path 3 as shown in FIG. 1*b* and a second position in which the closing element 5 leaves the vent path 3 open as shown in FIG. 1*a*. Said driving means comprises a permanent or switchable magnet 18 on the closing element 5 and electric coils 7, 8 arranged outside the guiding element 6 for generating magnetic field lines that cooperate with the permanent or switchable magnet 18 for moving the closing element 5. This is all evident for the skilled person, and requires no further elucidation. The closing element 5 comprises a first stop surface 9 that engages a first stop element 10 of the sound channel 1 in the first position of the closing element 5 and a second stop surface 11 that engages a second stop element 12 in the second position of the closing element. In this embodiment the second stop element 12 is part of the guiding element 6. The closing element 5 further comprises a sliding surface 13 that extends substantially parallel to a guiding surface 14 of said guiding element 6. In this exemplary embodiment the sliding surface 13 and said guiding surface 14 each have a substantially cylindrical shape, wherein the sliding surface 13 and guiding surface 14 are coaxially arranged with respect to each other. In this embodiment the cylindrical guiding surface 14 substantially encloses the circumference of the sliding surface 13. The closing element 5 is moveable in a reciprocating manner in a moving direction 15, wherein the moving direction 15 is substantially parallel to the common axis 16 of the coaxially arranged sliding surface 13 and guiding surface 14. As seen in an axial direction, i.e. in the direction of the common axis 16, said cylindrical sliding surface 13 of the closing element 5 may be arranged substantially within the cylindrical guiding surface 14 in the second position thereof as shown in FIG. 1*a* and extend partly outside and in particular beyond said guiding surface 14 in the first position thereof as shown in FIG. 1*b*.

In accordance with the invention a liquid 17 is present between the sliding surface 13 of said closing element 5 and the guiding surface 14 of said guiding element 6. Said liquid

17 reduces the maximum velocity of the closing element 5 when it moves between its first and second position and thereby the sound when it engages the first or second stop element 10, 12. As is clear from FIGS. 1*a* and 1*b*, the clearance between the sliding surface 13 and guiding surface 14 has a relatively small width compared to the cylindrical surface areas of the sliding surface 13 and guiding surface 14, such that the liquid may effectively reduce the maximum velocity of the closing element 5. Said liquid may be any suitable liquid, for example a liquid having a viscosity of between 100-400 cps or mPa·s. Said liquid may for example be an oil. Because of the capillary effect said liquid 17 will substantially remain within said clearance and if it leaves said clearance because of its adherence to the sliding surface 13 when the closing element 5 moves to its first position, it will remain on the sliding surface 13 and re-enter the clearance when the closing element 5 returns to its second position.

FIGS. 2*a*, 2*b* show the sound channel 1 according to a second embodiment of the invention. Only the differences with the first embodiment will be explained here. For a further description of the sound channel 1 of FIGS. 2*a*, 2*b* the reader is referred to the description relating to FIGS. 1*a*, 1*b*.

FIGS. 2*a*, 2*b* show that in this embodiment the cylindrical sliding surface 13 of the closing element 5 extends around the cylindrical guiding surface of the guiding element 6. The closing element 5 moves along the guiding element 6 in the moving direction 15 between its two positions. The guiding element 6 has a relatively long length, i.e. longer than the length of the closing element, said lengths being defined in the axial direction 16, such that in this embodiment the closing element 5 does not extend partly beyond the guiding element 6 in the first position.

In FIG. 3, the guiding element 6 and the closing element 5 are seen in an embodiment in which the closing element 5 has outwardly flairing portions 5' providing the advantage that the sliding can take place even when the closing element 5 and the guiding element 6, or the sliding surface and the guiding surface, do not have parallel axes. If the longitudinal axis of the closing element 5, or the channel therein in which the guiding element 6 extends, are non-parallel, edges of the two ends of the closing element may engage the guiding element in a manner so that sliding may be hampered. Using the flairing portions, such undesired engagement may be avoided. Another problem solved by the flairing portions is that the engagement of the edge may scrape the liquid away from the guiding surface. The flairing portion will act to force the closing element to re-align and thus allow the liquid to remain between the two surfaces. Also, the flairing portion will allow the liquid to enter the space between the surfaces by the capillary effect.

An alternative solution would be to in addition or alternatively have the guiding element have inwardly flairing or narrowing portions, indicated in hatched lines by 14', providing the same overall effect and advantages.

Although the invention has been discussed in the foregoing with reference to an exemplary embodiment of the system of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A sound channel for a portable audio device, the sound channel comprising:
- a wall including one or more openings at least partially defining a vent path through at least a portion of the sound channel;
- a closing element;
- a stop element; and
- a guiding surface for guiding a movement of the closing element,
- wherein said closing element is slidably moveable with respect to said guiding surface by a driving means between a first position in which the closing element substantially closes the vent path and a second position in which the closing element leaves the vent path open,
- wherein the closing element includes
  - a stop surface that engages the stop element in the first position of the closing element, and
  - a sliding surface that extends substantially parallel to said guiding surface, and
- wherein a liquid is present between the sliding surface of said closing element and the guiding surface.

2. The sound channel according to claim 1, wherein said liquid is a viscous liquid.

3. The sound channel according to claim 2, wherein said liquid has a viscosity of between 100-400 mPa·s.

4. The sound channel according to claim 1, wherein said liquid is an oil.

5. The sound channel according to claim 1, wherein said liquid is biocompatible.

6. The sound channel according to claim 1, wherein
- the sliding surface of the closing element and the guiding surface collectively define a clearance between the sliding surface of the closing element and the guiding surface, the clearance having a width and a length, the width defined in a direction orthogonal to the sliding surface and the guiding surface, and
- the width is smaller than the length.

7. The sound channel according to claim 6, wherein the width is 10 times smaller than the length.

8. The sound channel according to claim 7, wherein the width is 20 times smaller than the length.

9. The sound channel according to claim 1, wherein
- said sliding surface and said guiding surface have a substantially cylindrical shape, and
- the sliding surface and the guiding surface are coaxially arranged with respect to each other.

10. The sound channel according to claim 9, wherein
- said closing element is moveable in a reciprocating manner in a moving direction, and
- the moving direction is substantially parallel to a common axis of the sliding surface and the guiding surface that are coaxially arranged with respect to each other.

11. The sound channel according to claim 1, further comprising a guiding element that comprises said guiding surface.

12. The sound channel according to claim 11, wherein
- said closing element comprises a second stop surface that engages a second stop element of the sound channel in the second position of the closing element, and
- said second stop element is part of said guiding element.

13. The sound channel according to claim 1, wherein said closing element comprises a second stop surface that engages a second stop element of the sound channel in the second position of the closing element.

14. The sound channel according to claim 1, wherein the guiding surface extends through a channel defined by the sliding surface.

15. The sound channel according to claim 14, wherein the closing element defines outwardly flairing portions of the channel.

16. The sound channel according to claim 14, wherein the guiding surface defines inwardly flairing or narrowing portions.

17. A portable audio device comprising:

a transducer for generating acoustic energy; and the sound channel according to claim 1, the sound channel connected to the transducer via a sound opening.

18. A method of operating the portable audio device according to claim 17, the method comprising:

a) providing the portable audio device; and b) moving said closing element between said first position in which the closing element substantially closes the vent path and said second position in which the closing element leaves the vent path open using said driving means, wherein the liquid that is present between the sliding surface of the closing element and the guiding surface limits a maximum velocity of the movement of the closing element.

19. The portable audio device of claim 17, wherein the portable audio device is a headphone, or an in-ear device, wherein the in-ear device is one of a hearing aid, a hearing device, a hearable, an earphone, or an earbud.

20. A method of operating the sound channel according to claim 1, the method comprising:

a) providing the sound channel; and b) moving said closing element between said first position in which the closing element substantially closes the vent path and said second position in which the closing element leaves the vent path open using said driving means, wherein the liquid that is present between the sliding surface of the closing element and the guiding surface limits a maximum velocity of the movement of the closing element.

* * * * *